United States Patent
Poplawski et al.

(10) Patent No.: US 10,356,573 B2
(45) Date of Patent: Jul. 16, 2019

(54) THERMOSTAT SYNCHRONIZATION VIA REMOTE INPUT DEVICE

(71) Applicant: BRAEBURN SYSTEMS LLC, Montgomery, IL (US)

(72) Inventors: Daniel S. Poplawski, Oswego, IL (US); Ernest E. Soderlund, Hampshire, IL (US); W. L. Ha, Admiralty (HK)

(73) Assignee: Braeburn Systems LLC, Montgomery, IL (US)

( * ) Notice: Subject to any disclaimer, the term of this patent is extended or adjusted under 35 U.S.C. 154(b) by 634 days.

(21) Appl. No.: 14/920,188

(22) Filed: Oct. 22, 2015

(65) Prior Publication Data

US 2016/0131385 A1  May 12, 2016

Related U.S. Application Data

(60) Provisional application No. 62/067,148, filed on Oct. 22, 2014.

(51) Int. Cl.
  *H04W 4/20* (2018.01)
  *H04W 84/12* (2009.01)

(52) U.S. Cl.
  CPC ............ *H04W 4/20* (2013.01); *H04W 84/12* (2013.01)

(58) Field of Classification Search
  CPC .... H04W 4/20; H04W 84/12; H04L 41/0803; G05B 13/02; G05B 19/0426; G06Q 50/06; F24F 11/86; G05D 23/1917
  See application file for complete search history.

(56) References Cited

U.S. PATENT DOCUMENTS

| 2,054,039 A | 9/1936 | Persons |
| 2,060,636 A | 11/1936 | Persons |
| 2,253,418 A | 8/1941 | Crandall et al. |
| 2,703,228 A | 3/1955 | Fleisher |
| 3,309,021 A | 3/1967 | Powers |
| 3,385,574 A | 5/1968 | Lohman |
| 3,481,588 A | 12/1969 | Lobb |
| 3,705,479 A | 12/1972 | Mcpherson |

(Continued)

FOREIGN PATENT DOCUMENTS

| JP | 58065977 | 4/1983 |
| JP | 2004218436 | 8/2004 |
| JP | 2006009596 | 1/2006 |

OTHER PUBLICATIONS

ComfortLink II XL950 Control, User Guide, Trane U.S. Inc., 2011.

(Continued)

*Primary Examiner* — David Lam
(74) *Attorney, Agent, or Firm* — The Law Offices of Konrad Sherinian, LLC

(57) ABSTRACT

The invention provides a method of inputting a code to a thermostat comprising the following steps, providing a thermostat having a display panel and a receiver for receiving signals from a local router, the local router configured to receive signals via the internet from a remote input device (RID), transmitting a register command to the local router, transmitting new user information to the local router and the thermostat receiving a serial number from the local router and the thermostat synchronizing with the RID without requiring any direct inputs to the display panel of the thermostat. The RID may verify the service set identifier (SSID).

6 Claims, 13 Drawing Sheets

(56) References Cited

U.S. PATENT DOCUMENTS

| | | |
|---|---|---|
| 3,724,824 A | 4/1973 | Mitich |
| 3,733,062 A | 5/1973 | Bracich |
| 3,774,588 A | 11/1973 | Yeagle |
| 3,799,517 A | 3/1974 | Tamm |
| 3,823,922 A | 7/1974 | McElreath |
| 4,036,597 A | 7/1977 | Filss |
| 4,056,582 A | 11/1977 | Chow |
| 4,075,864 A | 2/1978 | Schrader |
| 4,185,687 A | 1/1980 | Stockman |
| 4,316,256 A | 2/1982 | Hendricks et al. |
| 4,382,544 A | 5/1983 | Stewart |
| 4,399,031 A | 8/1983 | Imano et al. |
| 4,606,401 A | 8/1986 | Levine |
| 4,730,941 A | 3/1988 | Levine et al. |
| 4,733,719 A | 3/1988 | Levine |
| 4,838,482 A | 6/1989 | Vogelzang |
| 4,948,040 A | 8/1990 | Kobayashi et al. |
| 4,967,382 A | 10/1990 | Hall |
| 5,023,432 A | 6/1991 | Boykin |
| 5,038,851 A | 8/1991 | Mehta |
| 5,171,486 A | 12/1992 | Penno |
| 5,230,482 A | 7/1993 | Ratz et al. |
| 5,259,445 A | 11/1993 | Pratt et al. |
| 5,428,964 A | 7/1995 | Lobdell |
| 5,482,209 A | 1/1996 | Cochran et al. |
| 5,491,615 A | 2/1996 | Nichols |
| 5,547,017 A | 8/1996 | Rudd |
| 5,566,879 A | 10/1996 | Longtin |
| 5,673,850 A | 10/1997 | Uptegraph |
| 5,697,552 A | 12/1997 | McHugh et al. |
| 5,765,636 A | 6/1998 | Meyer et al. |
| 5,782,296 A | 7/1998 | Mehta |
| 5,795,505 A | 8/1998 | Penno |
| 5,873,519 A | 2/1999 | Beilfuss |
| 5,924,486 A | 7/1999 | Ehlers et al. |
| 5,937,942 A | 8/1999 | Bias et al. |
| 5,983,146 A | 11/1999 | Sarbach |
| 6,116,512 A | 9/2000 | Dushane |
| 6,196,467 B1 | 3/2001 | Dushane |
| 6,205,533 B1 | 3/2001 | Margolous et al. |
| 6,213,404 B1 | 4/2001 | Dushane |
| 6,241,156 B1 | 6/2001 | Kline et al. |
| 6,304,803 B1 | 10/2001 | Dao |
| 6,315,211 B1 | 11/2001 | Sartain |
| 6,318,639 B1 | 11/2001 | Toth |
| 6,415,023 B2 | 1/2002 | Iggulden |
| 6,435,418 B1 | 8/2002 | Toth et al. |
| 6,478,233 B1 | 11/2002 | Shah |
| 6,499,038 B2 | 12/2002 | Kitayama |
| 6,502,758 B2 | 1/2003 | Cottrell |
| 6,549,870 B2 | 4/2003 | Proffitt et al. |
| 6,595,430 B1 | 7/2003 | Shah |
| 6,617,954 B2 | 9/2003 | Firestine |
| 6,621,507 B1 | 9/2003 | Shah |
| 6,628,997 B1 | 9/2003 | Fox et al. |
| 6,714,222 B1 | 3/2004 | Bjorn et al. |
| 6,783,079 B2 | 8/2004 | Carey et al. |
| 6,814,299 B1 | 11/2004 | Carey |
| 6,824,069 B2 | 11/2004 | Rosen |
| 6,851,621 B1 | 2/2005 | Wacker et al. |
| 6,892,547 B2 | 5/2005 | Strand |
| 6,988,671 B2 | 1/2006 | DeLuca |
| 7,003,378 B2 | 2/2006 | Poth |
| 7,028,912 B1 | 4/2006 | Rosen |
| 7,047,092 B2 | 5/2006 | Wimsatt |
| 7,050,026 B1 | 5/2006 | Rosen |
| 7,055,759 B2 | 6/2006 | Wacker et al. |
| D524,663 S | 7/2006 | Moore |
| D525,154 S | 7/2006 | Moore |
| D527,288 S | 8/2006 | Moore |
| D527,658 S | 9/2006 | Moore |
| D530,633 S | 10/2006 | Moore |
| 7,114,554 B2 | 10/2006 | Bergman et al. |
| D531,528 S | 11/2006 | Moore |
| 7,142,948 B2 | 11/2006 | Metz |
| D533,793 S | 12/2006 | Moore |
| D534,088 S | 12/2006 | Moore |
| 7,146,253 B2 | 12/2006 | Hoog et al. |
| D534,443 S | 1/2007 | Moore |
| 7,156,317 B1 | 1/2007 | Moore |
| 7,156,318 B1 | 1/2007 | Rosen |
| D536,271 S | 2/2007 | Moore |
| 7,181,317 B2 | 2/2007 | Amundson et al. |
| 7,222,800 B2 | 5/2007 | Wruck |
| 7,225,054 B2 | 5/2007 | Amundson et al. |
| 7,274,972 B2 | 9/2007 | Amundson et al. |
| 7,287,709 B2 | 10/2007 | Proffitt et al. |
| 7,302,642 B2 | 11/2007 | Smith et al. |
| 7,306,165 B2 | 12/2007 | Shah |
| 7,320,110 B2 | 1/2008 | Shah |
| 7,360,717 B2 | 4/2008 | Shah |
| 7,438,469 B1 | 10/2008 | Moore |
| 7,454,269 B1 | 11/2008 | Dushane et al. |
| 7,489,303 B1 | 2/2009 | Pryor |
| 7,513,438 B2 | 4/2009 | Mueller |
| 7,556,207 B2 | 7/2009 | Mueller et al. |
| 7,565,813 B2 | 7/2009 | Pouchak |
| 7,584,897 B2 | 9/2009 | Schultz et al. |
| 7,593,212 B1 | 9/2009 | Toth |
| 7,604,046 B2 | 10/2009 | Bergman et al. |
| 7,614,567 B2 | 11/2009 | Chapman, Jr. et al. |
| 7,636,604 B2 | 12/2009 | Bergman et al. |
| 7,693,582 B2 | 4/2010 | Bergman et al. |
| 7,693,583 B2 | 4/2010 | Wolff et al. |
| 7,703,694 B2 | 4/2010 | Mueller et al. |
| 7,706,923 B2 | 4/2010 | Amundson et al. |
| 7,748,225 B2 | 7/2010 | Butler et al. |
| 7,702,421 B2 | 8/2010 | Sullivan et al. |
| 7,775,454 B2 | 8/2010 | Mueller et al. |
| 7,784,291 B2 | 8/2010 | Butler et al. |
| 7,784,705 B2 | 8/2010 | Kasper et al. |
| 7,801,646 B2 | 9/2010 | Amundson et al. |
| 7,802,618 B2 | 9/2010 | Simon et al. |
| 7,845,576 B2 | 12/2010 | Siddaramanna |
| 7,861,941 B2 | 1/2011 | Schultz et al. |
| 7,867,646 B2 | 1/2011 | Rhodes |
| 7,941,819 B2 | 5/2011 | Stark |
| 7,954,726 B2 | 6/2011 | Siddaramanna et al. |
| 7,963,454 B2 | 6/2011 | Sullivan |
| D643,318 S | 8/2011 | Morrow |
| 7,992,794 B2 | 8/2011 | Leen et al. |
| 8,066,263 B1 | 11/2011 | Soderlund |
| 8,083,154 B2 | 12/2011 | Schultz et al. |
| 8,167,216 B2 | 5/2012 | Schultz et al. |
| 8,175,782 B2 | 5/2012 | Gepperth et al. |
| D662,837 S | 7/2012 | Morrow |
| D662,838 S | 7/2012 | Morrow |
| D662,839 S | 7/2012 | Morrow |
| D662,840 S | 7/2012 | Morrow |
| D663,224 S | 7/2012 | Morrow |
| 8,219,251 B2 | 7/2012 | Amundson et al. |
| 8,239,067 B2 | 8/2012 | Amundson et al. |
| 8,239,922 B2 | 8/2012 | Sullivan |
| 8,244,383 B2 | 8/2012 | Bergman et al. |
| 8,280,536 B1 | 10/2012 | Fadell et al. |
| 8,346,396 B2 | 1/2013 | Amundson et al. |
| 8,387,892 B2 | 3/2013 | Koster et al. |
| 8,517,088 B2 | 8/2013 | Moore et al. |
| 8,538,588 B2 | 9/2013 | Kasper |
| 8,549,658 B2 | 10/2013 | Kolavennu et al. |
| 8,620,460 B2 | 12/2013 | Eergman et al. |
| 8,689,353 B2 | 4/2014 | Bünter |
| 8,690,074 B2 | 4/2014 | Moore et al. |
| 8,701,210 B2 | 4/2014 | Cheng et al. |
| 8,733,667 B2 | 5/2014 | Moore et al. |
| 8,950,687 B2 | 2/2015 | Bergman |
| 8,978,994 B2 | 3/2015 | Moore et al. |
| 9,014,860 B2 | 4/2015 | Moore et al. |
| 9,201,431 B2 | 12/2015 | Lyle |
| 9,208,676 B2 * | 12/2015 | Fadell .................. G05B 19/042 |
| 9,304,676 B2 | 4/2016 | Poplawski |
| 2001/0003451 A1 | 6/2001 | Armstrong |
| 2002/0065809 A1 | 5/2002 | Kitayama |
| 2002/0096572 A1 | 7/2002 | Chene et al. |

(56) References Cited

U.S. PATENT DOCUMENTS

| | | |
|---|---|---|
| 2004/0133314 A1 | 7/2004 | Ehlers |
| 2004/0193324 A1 | 9/2004 | Hoog |
| 2004/0245352 A1 | 12/2004 | Smith |
| 2004/0256472 A1 | 12/2004 | DeLuca |
| 2004/0260427 A1 | 12/2004 | Wimsatt |
| 2005/0033707 A1 | 2/2005 | Ehlers |
| 2005/0040248 A1 | 2/2005 | Wacker |
| 2005/0040249 A1 | 2/2005 | Wacker |
| 2005/0082836 A1 | 4/2005 | Lagerwey |
| 2005/0108620 A1 | 5/2005 | Allyn et al. |
| 2005/0194457 A1 | 9/2005 | Dolan |
| 2005/0198591 A1 | 9/2005 | Jarrett |
| 2006/0030954 A1 | 2/2006 | Bergman |
| 2006/0290140 A1 | 6/2006 | Yoshida |
| 2006/0220386 A1 | 10/2006 | Wobben |
| 2007/0045429 A1 | 3/2007 | Chapman, Jr. |
| 2007/0045441 A1 | 3/2007 | Ashworth |
| 2007/0114291 A1 | 5/2007 | Pouchak |
| 2007/0221741 A1 | 9/2007 | Wagner |
| 2007/0228182 A1 | 10/2007 | Wagner et al. |
| 2007/0228183 A1 | 10/2007 | Kennedy |
| 2007/0257120 A1 | 11/2007 | Chapman, Jr. et al. |
| 2007/0278320 A1 | 12/2007 | Lunacek et al. |
| 2008/0271475 A1 | 11/2008 | Wuesthoff |
| 2009/0001182 A1 | 1/2009 | Siddaramanna |
| 2009/0024965 A1 | 1/2009 | Zhdankin |
| 2009/0057424 A1 | 3/2009 | Sullivan et al. |
| 2009/0057427 A1 | 3/2009 | Geadelmann |
| 2009/0062964 A1 | 3/2009 | Sullivan |
| 2009/0129931 A1 | 5/2009 | Stiesdal |
| 2009/0140056 A1 | 6/2009 | Leen |
| 2009/0140064 A1 | 6/2009 | Schultz |
| 2010/0031193 A1 | 2/2010 | Stark |
| 2010/0070089 A1 | 3/2010 | Harrod et al. |
| 2010/0117975 A1 | 5/2010 | Cho et al. |
| 2010/0127502 A1 | 5/2010 | Uchino et al. |
| 2010/0145528 A1 | 6/2010 | Bergman et al. |
| 2010/0261465 A1 * | 10/2010 | Rhoads ............ G08C 17/00 455/420 |
| 2010/0318200 A1 | 12/2010 | Foslien |
| 2011/0004825 A1 | 1/2011 | Wallaert |
| 2011/0031806 A1 | 2/2011 | Altonen et al. |
| 2011/0054710 A1 | 3/2011 | Imes |
| 2011/0112998 A1 | 5/2011 | Abe |
| 2011/0261002 A1 | 10/2011 | Verthein |
| 2011/0273394 A1 | 11/2011 | Young |
| 2012/0067561 A1 | 3/2012 | Bergman |
| 2012/0074710 A1 | 3/2012 | Yoshida |
| 2012/0131504 A1 | 5/2012 | Fadell |
| 2012/0168524 A1 | 7/2012 | Moore et al. |
| 2012/0169675 A1 | 7/2012 | Moore et al. |
| 2012/0203379 A1 | 8/2012 | Sloo |
| 2012/0221149 A1 | 8/2012 | Kasper |
| 2012/0229521 A1 | 9/2012 | Hales, IV |
| 2012/0232703 A1 | 9/2012 | Moore |
| 2012/0239221 A1 | 9/2012 | Mighdoll |
| 2012/0329528 A1 | 12/2012 | Song |
| 2013/0032414 A1 | 2/2013 | Yilmaz |
| 2013/0056989 A1 | 5/2013 | Sabhapathy |
| 2013/0215088 A1 | 8/2013 | Son et al. |
| 2013/0263034 A1 | 10/2013 | Bruck |
| 2013/0338838 A1 | 12/2013 | Moore |
| 2013/0345883 A1 | 12/2013 | Sloo |
| 2014/0098247 A1 * | 4/2014 | Rao .................. H04W 4/20 348/207.1 |
| 2014/0152631 A1 | 6/2014 | Moore et al. |
| 2014/0156087 A1 * | 6/2014 | Amundson ............ G05B 15/02 700/278 |
| 2014/0163746 A1 | 6/2014 | Drew |
| 2014/0316581 A1 | 10/2014 | Fadell |
| 2014/0319233 A1 | 10/2014 | Novotny |
| 2015/0081568 A1 | 3/2015 | Land, III |
| 2015/0167995 A1 | 6/2015 | Fadell |
| 2015/0233595 A1 | 8/2015 | Fadell |
| 2015/0280935 A1 | 10/2015 | Poplawski et al. |
| 2016/0062618 A1 | 3/2016 | Fagan |
| 2016/0124828 A1 | 5/2016 | Moore et al. |
| 2016/0131385 A1 | 5/2016 | Poplawski et al. |
| 2016/0154576 A1 | 6/2016 | Moore et al. |
| 2017/0103689 A1 | 4/2017 | Moore et al. |
| 2017/0131825 A1 | 5/2017 | Moore et al. |
| 2017/0300025 A1 | 10/2017 | Moore et al. |
| 2017/0364104 A1 | 12/2017 | Poplawski et al. |

OTHER PUBLICATIONS

Cardio Iie Installer's Guide, System Version 2.5xx, 5th edition, 2008, Secant Home Automation Inc.

What you should know about flexible displays (FAQ); http://news.cnet.com/8301-1035_3-57607171-94/what-you-should-know-about-flexible-d . . . ; Nov. 25, 2013.

\* cited by examiner

US 10,356,573 B2

THERMOSTAT SYNCHRONIZATION VIA REMOTE INPUT DEVICE

This application claims the benefit and priority to Provisional application No. 62/067,148 filed on Oct. 22, 2014, entitled "THERMOSTAT CODE INPUT SYSTEM AND METHOD THEREFOR USING SSID", which is hereby incorporated by reference in its entirety. This application also claims the benefit and priority of U.S. patent application Ser. No. 14/671,535, entitled "THERMOSTAT CODE INPUT SYSTEM AND METHOD THEREFORE." filed on Mar. 27, 2015, which is hereby incorporated by reference. This application is also related to U.S. patent application Ser. No. 14/671,535, entitled "THERMOSTAT CODE INPUT SYSTEM AND METHOD THEREFORE." filed on Mar. 27, 2015.

The present invention pertains to heating, ventilation and/or air conditioning (HVAC) control system that accommodates and facilitates control from a remote input device.

BACKGROUND

HVAC control systems are used to control the environment within a building and are more frequently linked via the interact for web-enabled building control. The internet connection allows receipt of instructions from a remote and/or mobile device. However, there are many levels of complexity that can lead to difficult implementation and use of such controllers. For example, many wireless network communication protocols exist, such as Bluetooth, DSRC, EnOcean, IrDA, Redlink, RFC, Wi-Fi or Zigbee®. These wireless network communications must reliably link to components such as routers, hubs, sensors, computers, mobile phones or tablets and thermostats. A multitude of software and graphical user interfaces may be used to attempt to set-up and control the systems. All of this complexity can lead to layers of technical problems for the system installers and unsophisticated users. In particular, many users have difficulty with set-up procedures when there are a multitude of steps required to link the components of the system. The present invention overcomes many of such difficulties and provides for easy set-up and synchronization between a remote device and a HVAC control.

SUMMARY

The present invention provides for a method of inputting a code to a thermostat comprising the following steps providing a thermostat having a receiver for receiving signals from a local router, the local router configured to receive signals via the internet from a remote input device (RID), transmitting, by the RID, a register command to the local router, and placing a thermostat in a listen mode, transmitting, by the RID, new user information to the local router in order to trigger the local router to communicate with the thermostat, the thermostat synchronizing with the RID and receiving information from the RID without requiring any direct user inputs to the thermostat, and the thermostat receiving registration information from the local router and verifying, by the RID, the service set identifier (SSID).

The method wherein the local router provides a Wi-Fi network and the method including the step of receiving a Wi-Fi password at the thermostat. The method wherein the thermostat uses software tools to synchronize with the RID in one step. The method wherein the remote server sends a message to the user that a user account has been created successfully. The method wherein a successful account creation message is transmitted to the RID, the RID having a display and including one of a computer, tablet, phone, laptop, notebook, wireless computer, wireless tablet, wireless phone, wireless laptop, wireless notebook. The method wherein the RID receives an alert transmission that no valid internet connection is available, there is a communication loss, there is an unknown error, or other types of alerts.

The method wherein a user obtains the serial number by examining an authentication card or a panel of the thermostat where the thermostat serial number is displayed and inputting the thermostat serial number to the RID. The method wherein the transmission of the device name is input to the local router from the RID. The method wherein the transmission of appropriate Wi-Fi network data is transmitted to the RID.

The method wherein a se protocol is transmitted to a remote server that transmits the set-up protocol to the local router to associate the thermostat with the RID without requiring a single direct input by the user to the thermostat and a display panel of the thermostat is solely for manual control of the thermostat and there are no commands available on the display panel to input the SSID to synchronize the thermostat with the RID.

In an embodiment, the invention provides a thermostat configured for remote control comprising a display panel of the thermostat that is solely for manual control of the thermostat and there are no commands available on the display panel and no built in web server to synchronize the thermostat with a remote input device (RID) after the thermostat is placed in listen mode, a receiver disposed in the thermostat for receiving synchronizing codes from a local router, the local router capable of receiving instructions from the RID and the RID verifying the service set identifier (SSID).

The thermostat wherein the local router is capable of receiving communications from a Wi-Fi network, the RID configured to transmit a Wi-Fi password to the thermostat. The thermostat may receive a signal from the local router that a user account has been created successfully.

In another embodiment, the invention provides a web enabled building control system comprising a web enabled control device linked to al first network, and for receiving synchronizing instructions via the first network, one or more building environment control devices coupled to the web enabled building control device over a second network, at least one of the one or more building environment control devices coupled to one or more HVAC units, the web enabled control device configured to receive sensor information from at least one or more building environment control devices via the second network. The web enabled control device configured to link with and receive information via a server displaying a web-page or app page including configuration information and building schedule information, a set-up protocol is received by the building environment control device placed in listen mode over the second network without requiring a single direct input by a user to configure the building environment control device in order to receive signals from the web enabled control device, a display panel of the building environment control device is solely for manual control and there are no commands available on the display panel to synchronize the building environment control device from a web-page and the web enabled control device verifying the service set identifier (SSID).

The system wherein the web enabled building control device is further adapted to issue commands to at least one of the building environment control devices via the second network to activate or deactivate one or more HVAC units. The system wherein at least some of the commands are based in part on received sensor information. The system wherein at least some of the commands are based in part on building schedule information. The system wherein the building environment control device is a thermostat having as display panel and there are no commands available on the display panel or via physical buttons to configure or synchronize the thermostat via a remote wireless device after the thermostat has been placed in listen mode.

In a further embodiment, the present invention provides for a method of inputting a code to a thermostat comprising the steps of providing a thermostat having a display panel and a receiver for receiving signals from a local router, the local router configured to receive signals via the internet from a remote input device (RID), receiving by the local router a register command from the RID, receiving by the local router new user information from the RID and the thermostat receiving a serial number from the local router and the thermostat synchronizing with the RID without requiring any direct inputs to the display panel of the thermostat.

Figure 1:
FIGS. 1-21 are screen shots of set-up displays for registering a user account and linking to a local router.

While the invention is amenable to various modifications and alternate forms, specific embodiments have been shown by way of example in the drawings and will be described in detail, it should be understood that the intention is not to limit the invention to the particular embodiments described. The intention is to cover all modifications, equivalents and alternatives falling within the spirit and the scope of the invention.

DETAILED DESCRIPTION

Figure 21:
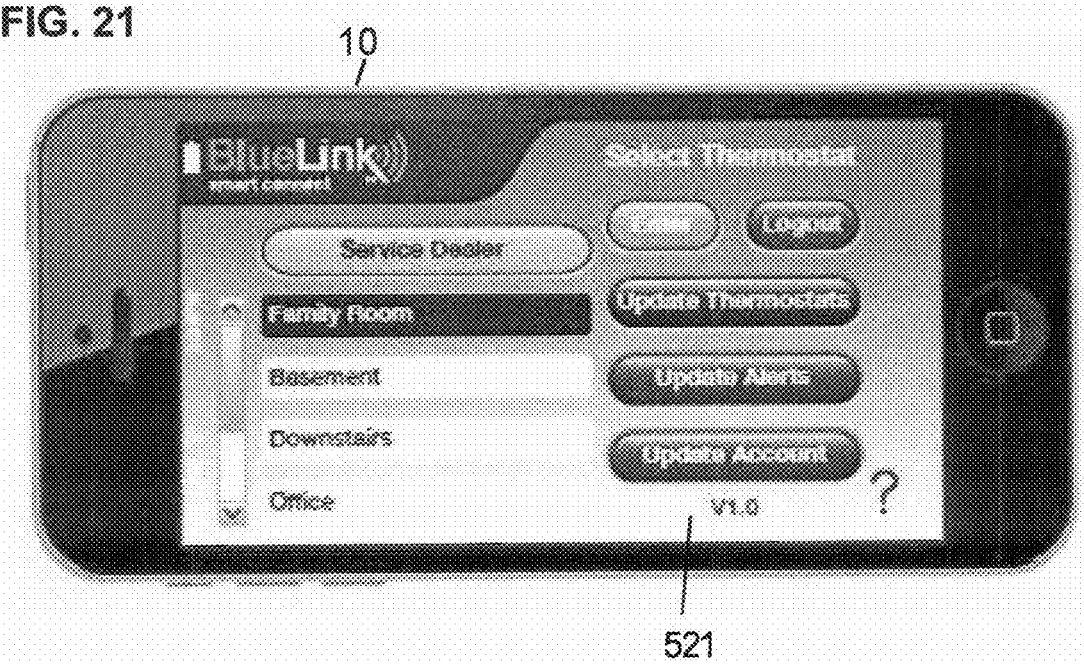
Figure 22:
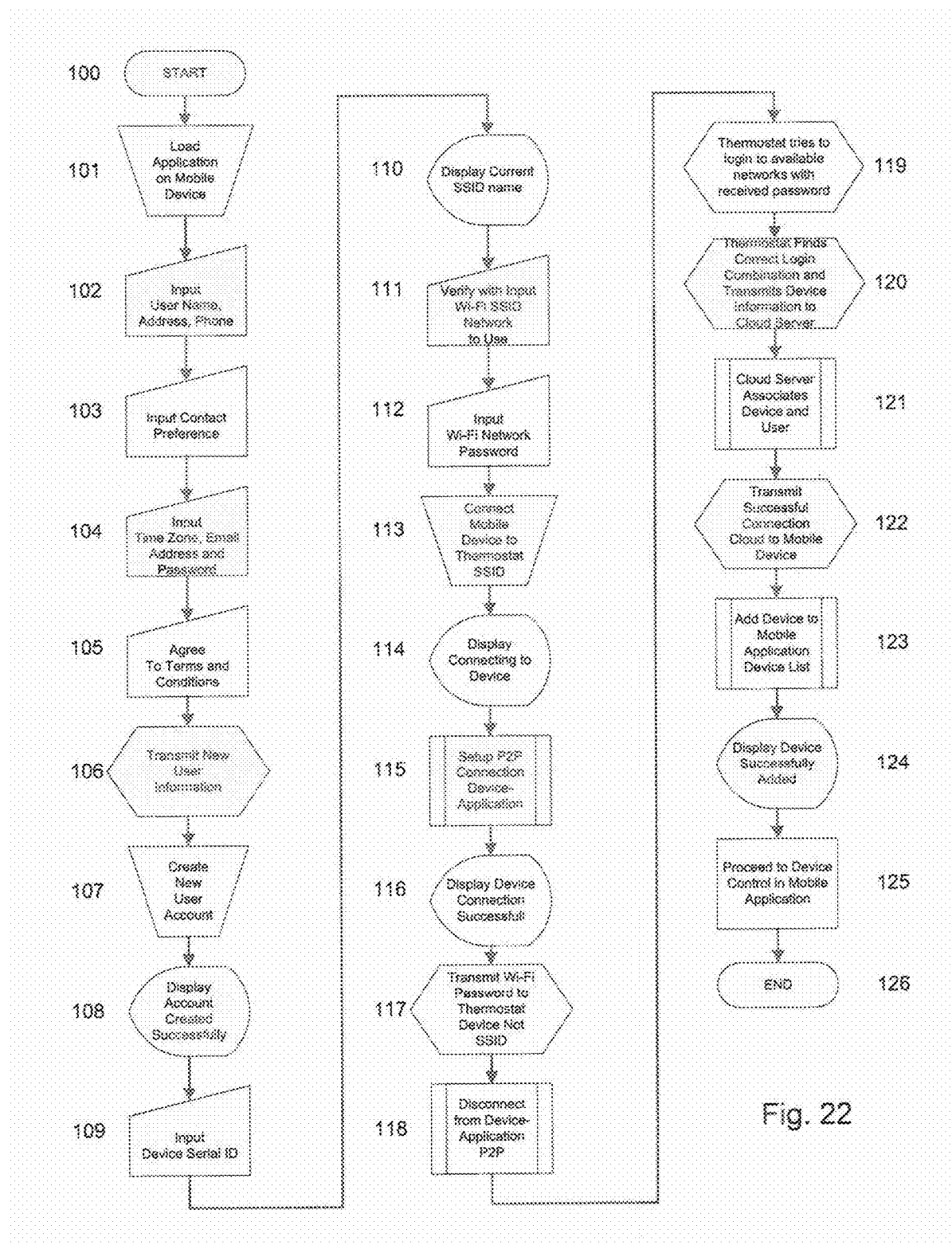
FIG. 22 is a flow diagram depicting the steps to configure and set-up a home comfort control device.
Figure 23:
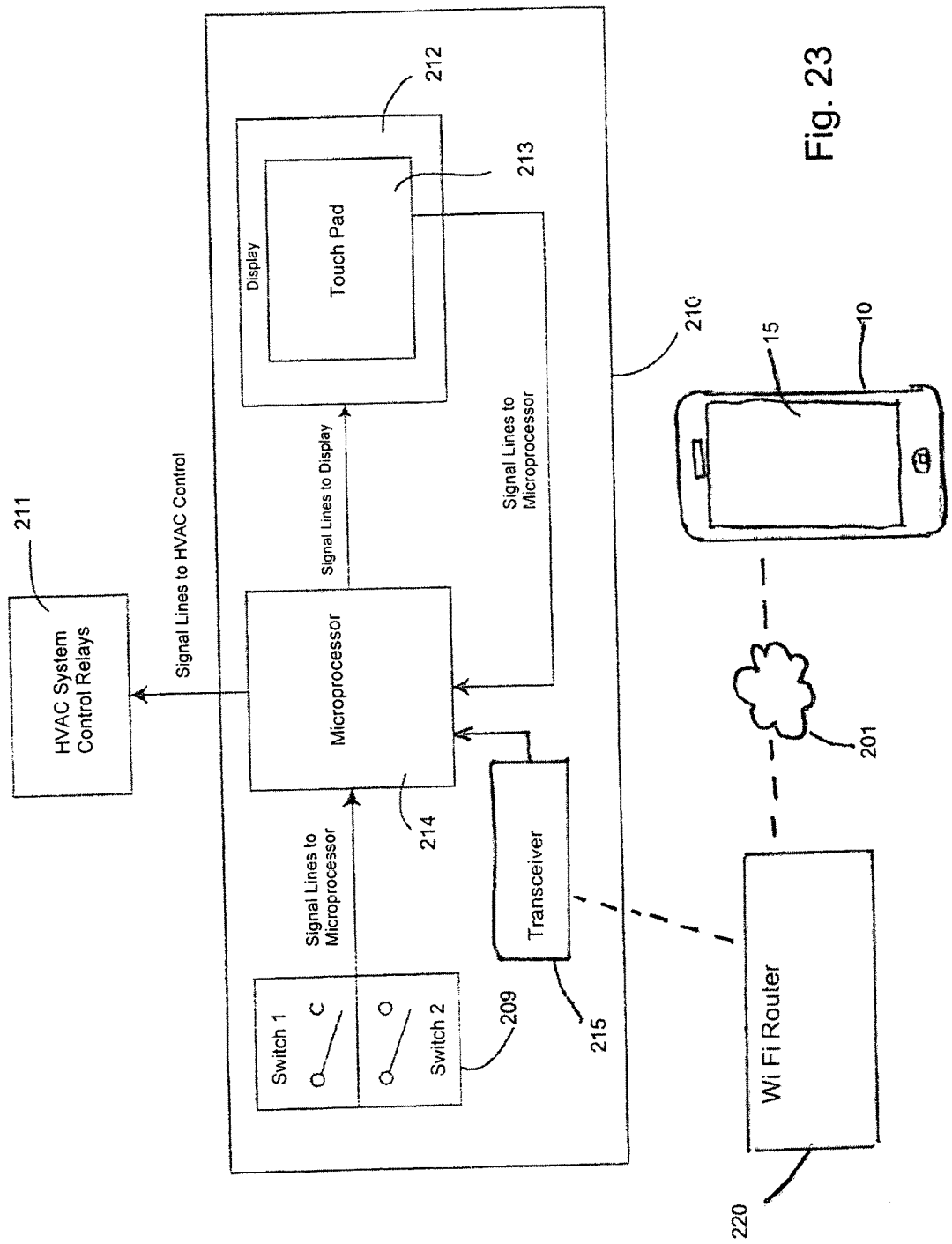
FIG. 23 is a schematic diagram of a household or building system for receiving configuration data from a remote wireless device to program a thermostat within the home.

Turning to FIGS. 1-23, an embodiment of the invention will be described. FIGS. 1-21 depict screen shots of a mobile device illustrating the steps of the present invention. FIG. 22 depicts a flow diagram illustrating the steps of the present invention. FIG. 23 depicts a schematic view of the present invention depicting the present invention. FIG. 23 depicts a mobile device such as a Smartphone or other handheld wireless device 10 that is capable of transmissions using Wi-Fi or WLAN under IEEE Communication Standard 802.11, or any other well-know wireless communication system.

FIG. 1 depicts a remote input device (RID) such as a Smartphone or other device that is capable of transmissions using Wi-Fi or WLAN under IEEE Communication Standard 802.11, or any other well-known wireless communication system. It is well known to use encryption means to send data and each of the data transmissions described below may be encrypted and decrypted. The RID may include a computer, tablet, phone, laptop, notebook, wireless computer, wireless tablet, wireless phone, wireless laptop or wireless notebook.

Figure 2:
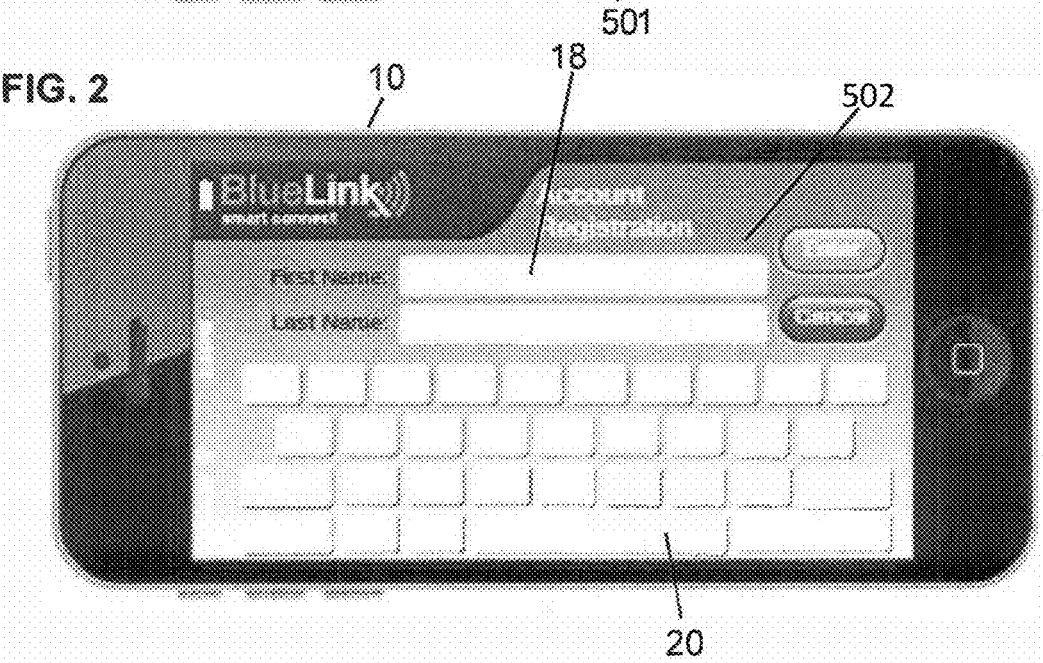
Figure 3:
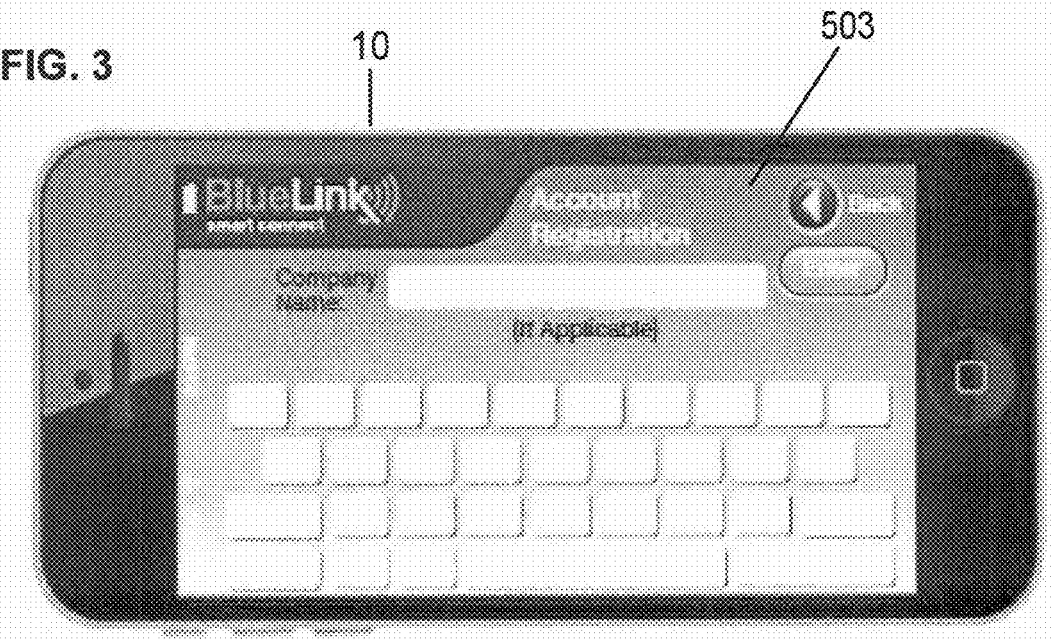
Figure 4:
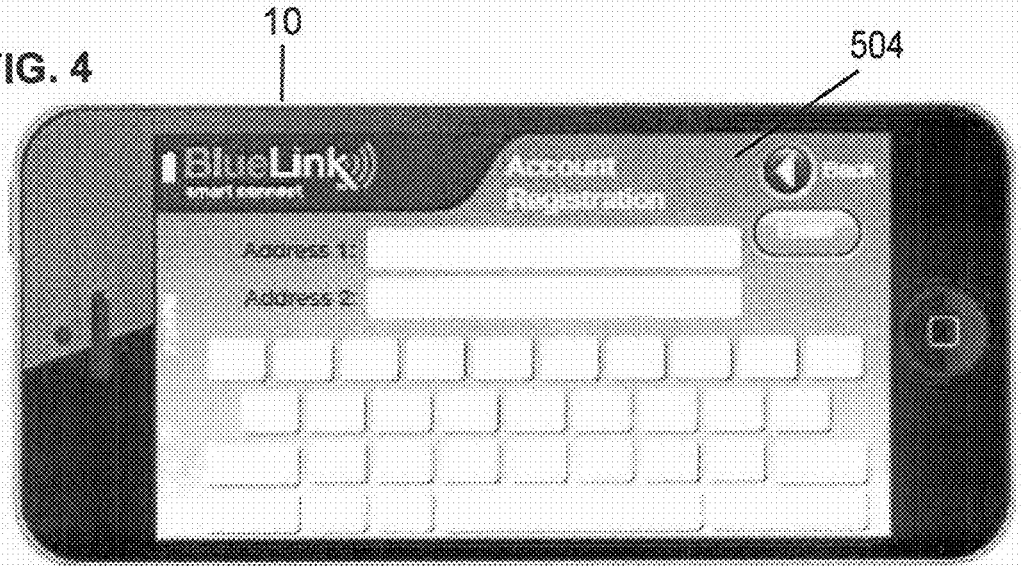

As shown in FIG. 1-2, the device 10 includes a touchscreen 15 (indicated in FIG. 23) including a data input area 18 and keypad area 20. Using well known systems such iPhone apps or Play apps from Google, or other well-known methods. The user starts the process at step 101 loading the (BlueLink) application on a mobile device 10. The display screen 501 in FIG. 1 depicts account registration screen and includes touch pad buttons for "Register" to create a new account, "Have an Account" to access an existing account, empty input blocks for "Email" and "Confirm email" input blocks. A user types on the keypad 20 in order to input their email address. This coincides with Step 102 of FIG. 22.

Figure 5:
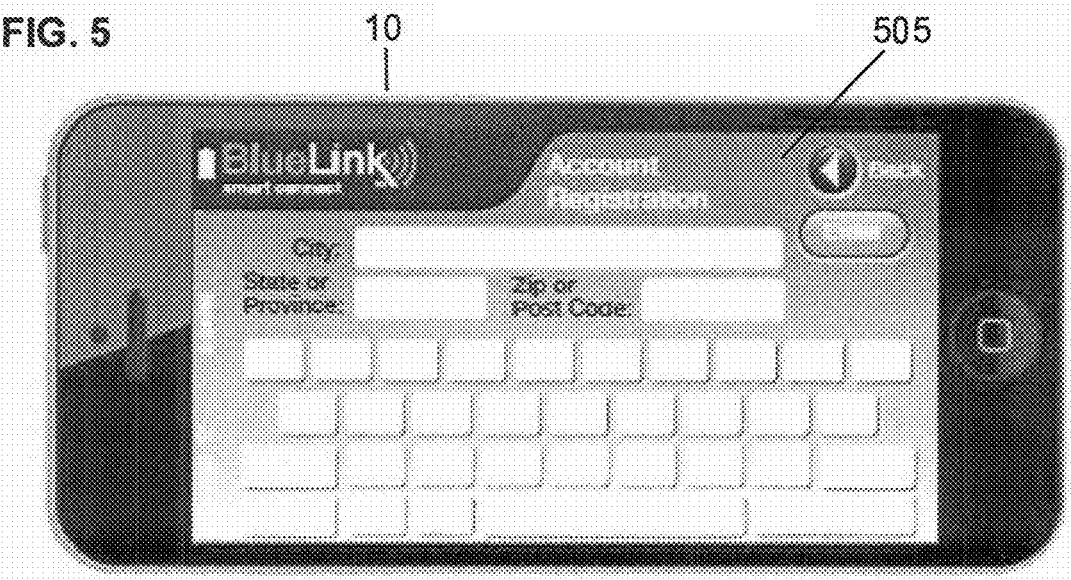
Figure 6:
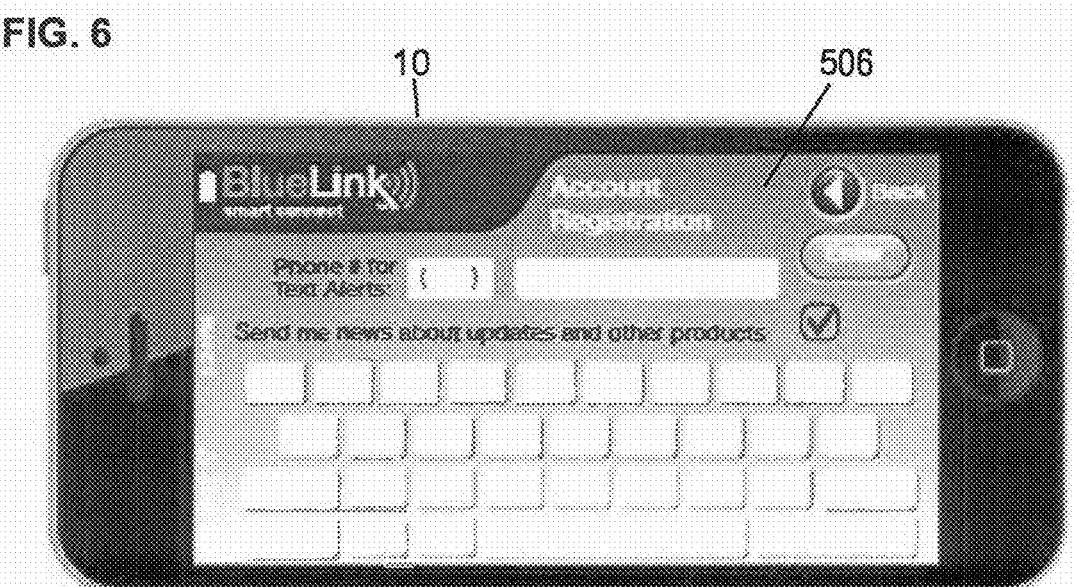
Figure 7:
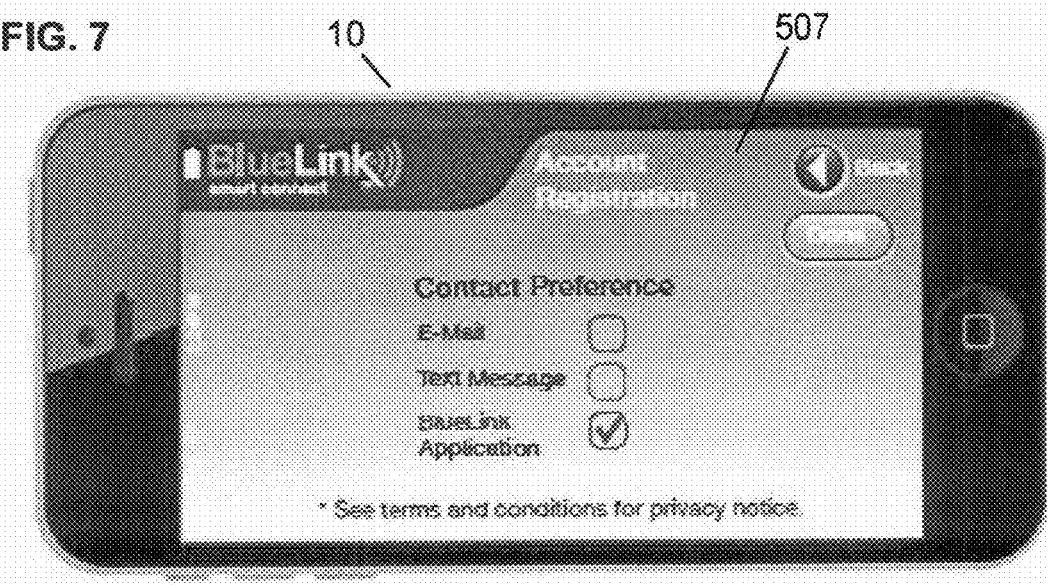

Turning to FIG. 2, the account registration screen is indicated at 502 and the user inputs a first and last name using keypad 20. At FIG. 3, the "Company Name" may be entered on the screen 503. At FIG. 4 the "Address" (1,2) may be entered via the screen 504. FIG. 5 provides the screen 505 for entry of city, state or providence and zip or post code. FIG. 6 depicts the screen 506 for entry of phone number for text alerts and allows the user to elect to receive news about updates and other products by marking the check box. FIG. 7 depicts screen 507 for the user to identify a contact reference by selecting a check box for E-mail, Text Message or BlueLink Application, according step 103 (FIG. 22).

In FIG. 7 the User's preferred method of being contacted is selecting by clinking on check boxes for "E-Mail," "Text Messages," or "BlueLink Application."

Figure 8:
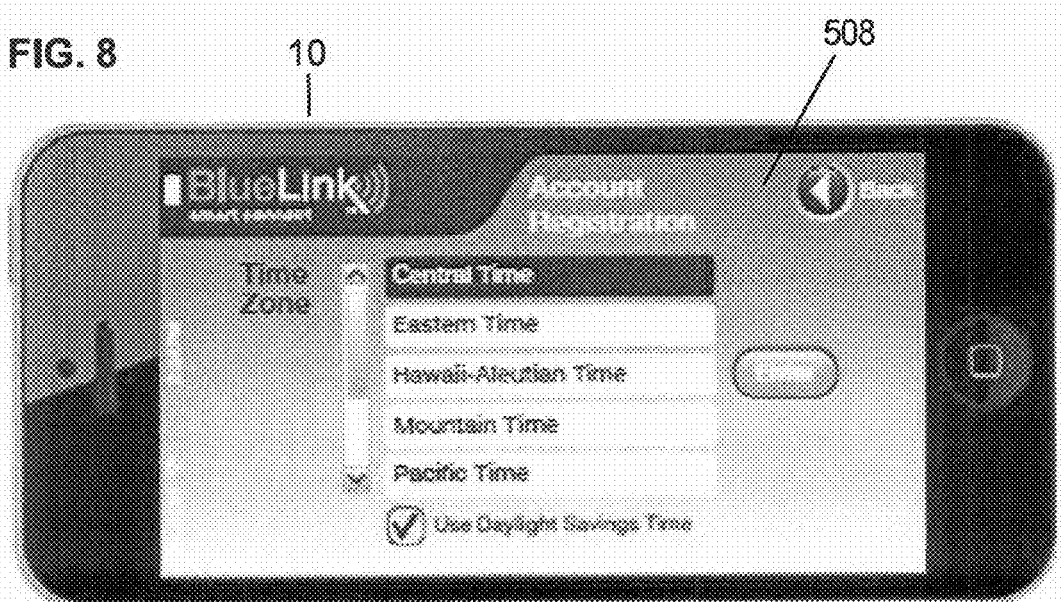
Figure 9:
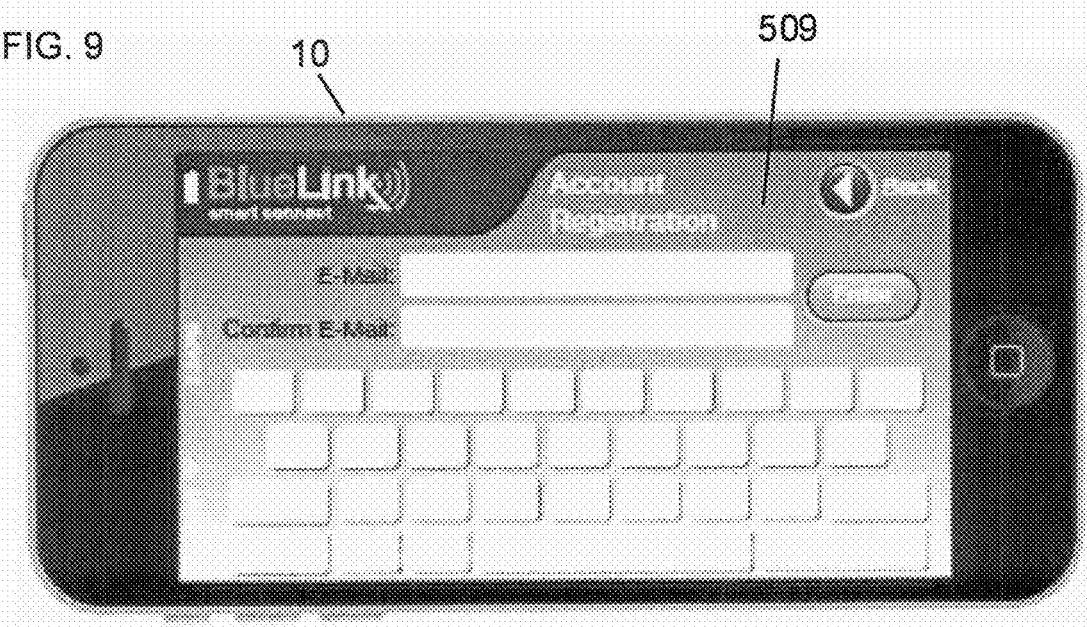
Figure 10:
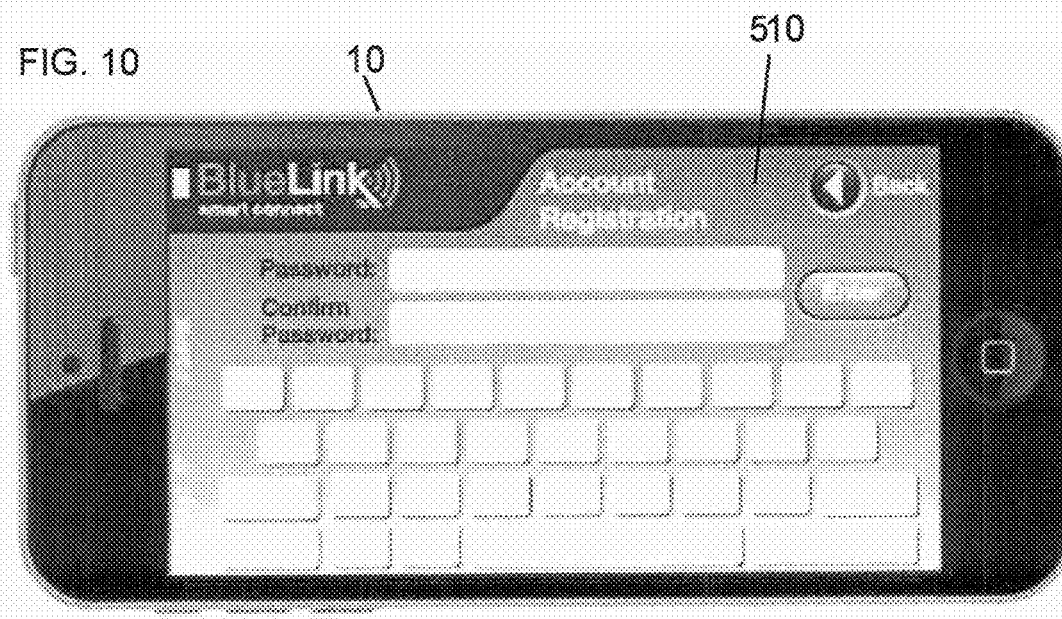

Turning to FIG. 8, step 104 is accomplished by selecting a time zone where the equipment resides. A scroll bar is present on the screen to allow display of multiple time zones. Also selection of Daylight Savings Time may be selected. Note that the keyboard area 20 has been removed and in this embodiment a time zone is selected by touching the screen 508. For example, when the "Central Time" Zone is selected, it will be highlighted in grey. This step is shown in FIG. 22 as step 104. Also at step 104, the user inputs an e-mail address using screen 509 depicted in FIG. 9 and password using screen 510 depicted in FIG. 10.

Figure 11:
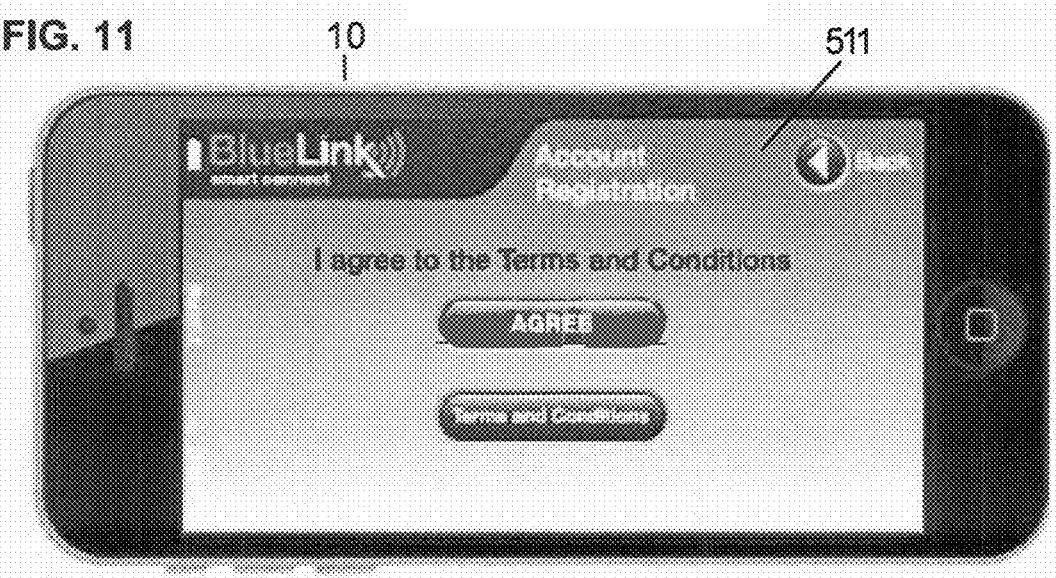

FIG. 11 depicts account registration screen 511 where the user agrees to the terms and conditions by pressing the "Agree" button or reviewing terms and conditions by pressing the "Terms and Conditions" button on the display screen 511. This coincides with Step 105 of FIG. 22.

Figure 12:
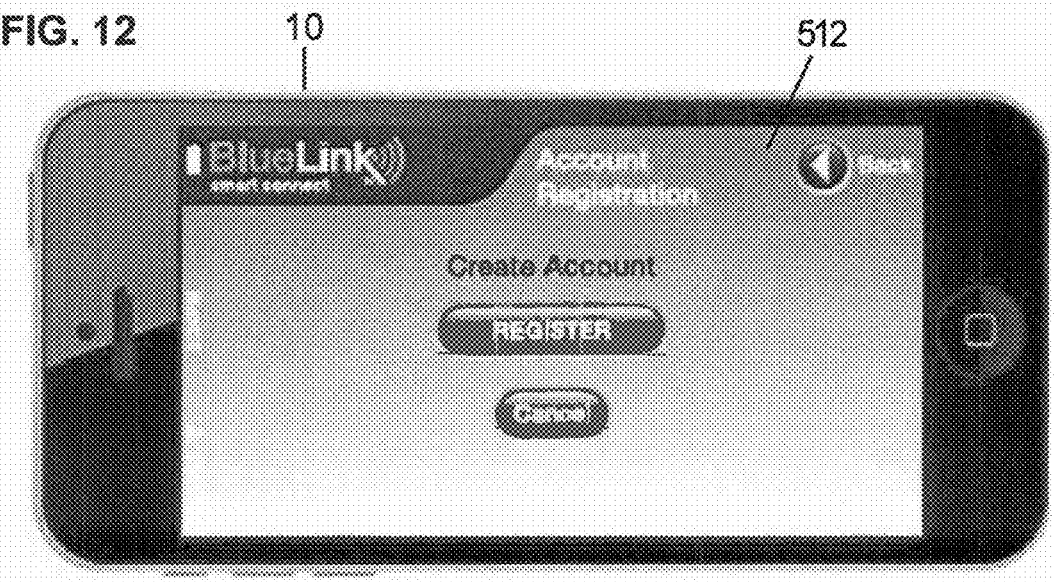

At FIG. 12, account registration screen 512 (continued) is displayed and allows the user to register by pressing the "Register" button on the screen 512 or to cancel the transaction by pressing the "Cancel" button. This coincides with Step 106 of FIG. 22. Upon selecting the Register button, the new user information will be transmitted.

Following the transmission of the new user information to a cloud server 201 (FIG. 23) configured to handle transactions for this system (BlueLink), a new user account is created. Well-known means of creating customer accounts using software tools may be accomplished at this Step 107.

Figure 13:
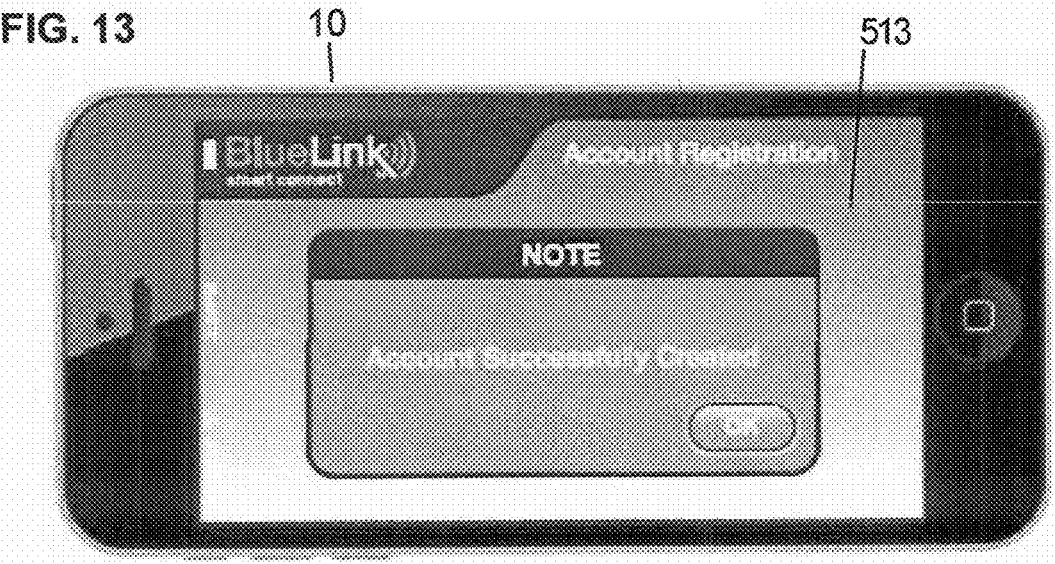
Figure 14:
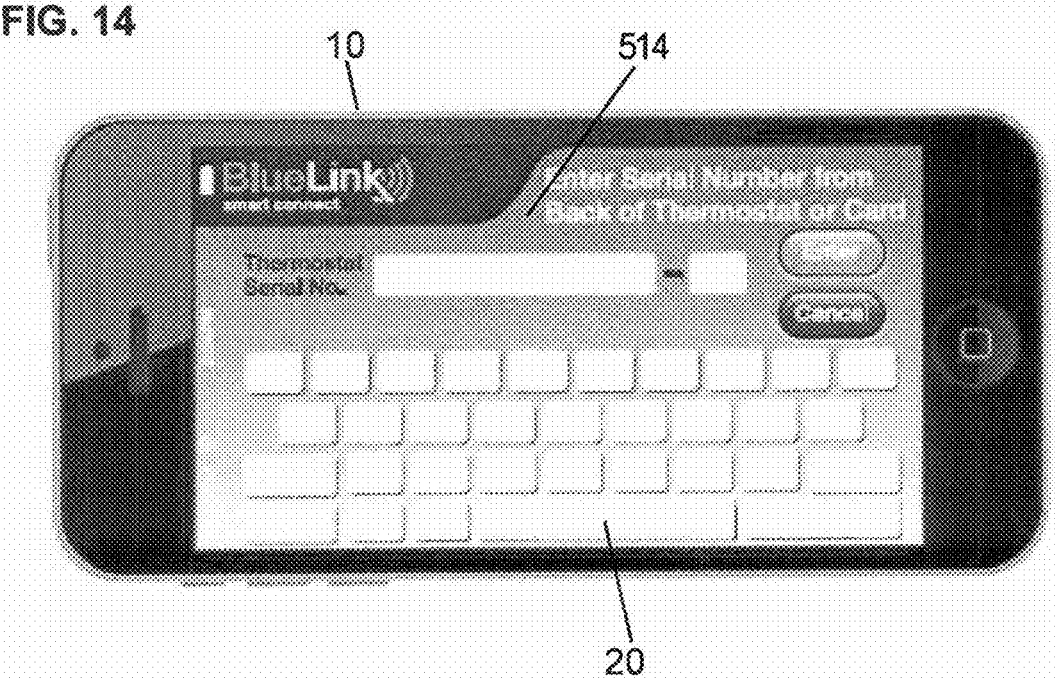

At Step 108, the server sends a message that the account has been created successfully. As depicted in FIG. 13 on the display screen 513 of the mobile device 10, a window is opened that states "Account Successfully Created". Other alerts that may be posted via the mobile device 10 include "No Valid Internet Connection," "Communication Loss," "Unknown Error," or other types of alerts. At the next Step 109, (FIG. 14) the screen display 514 changes and the keyboard area 20 is redisplayed so that the user can input the thermostat serial I.D. number. The user can review the user manual or authentication card where the serial I.D. number is displayed. Using the keypad 20, the user will enter the number in the block area in the display section 514 of the mobile device 10 as depicted in FIG. 14.

Figure 15:
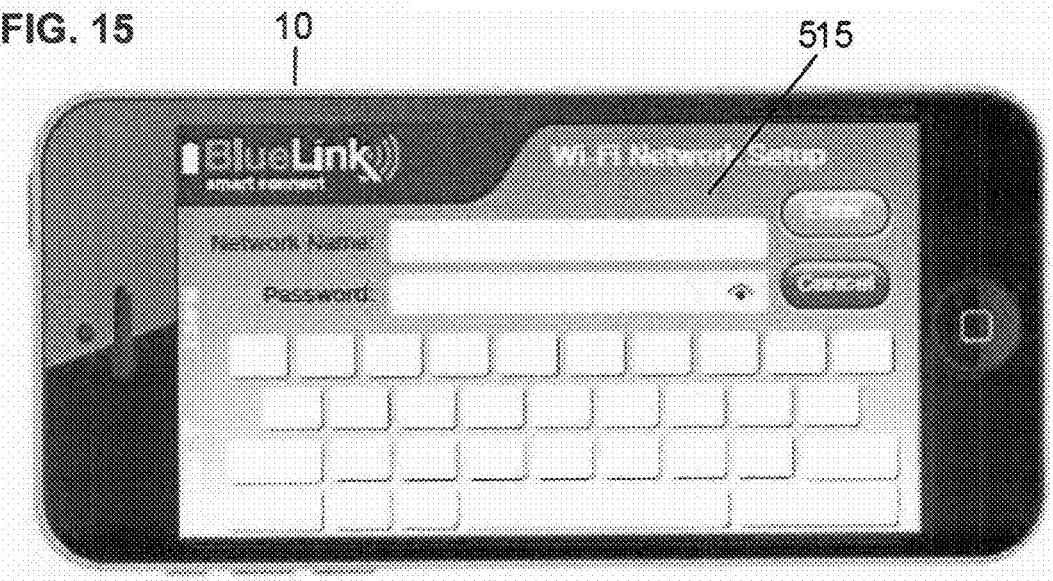
Figure 16:
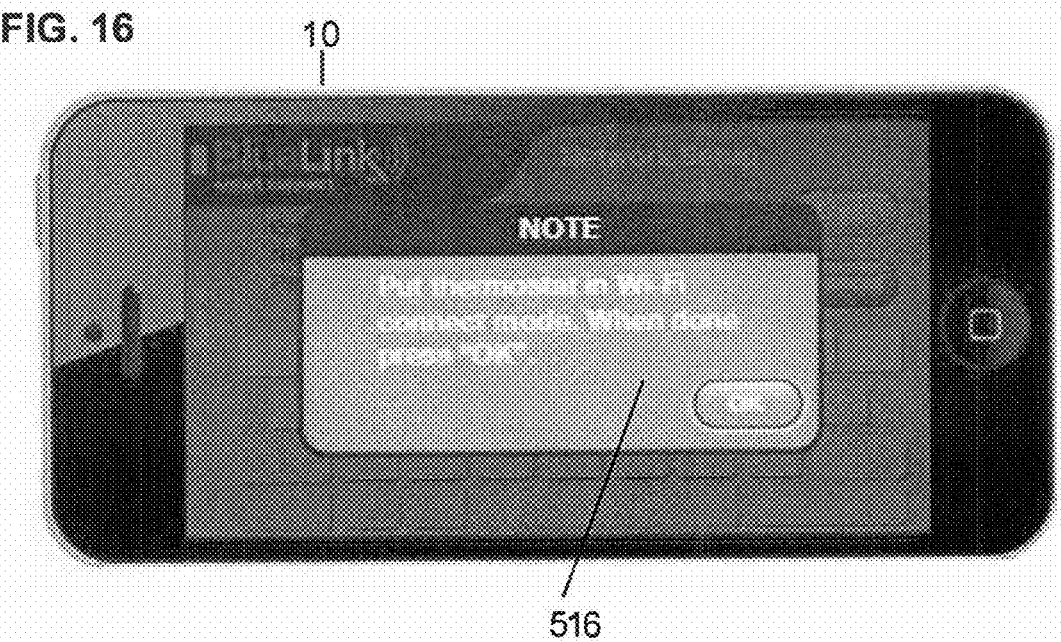

At Step 110, the service set identifier (SSID) name is displayed on the mobile device (FIG. 22). At step 111 the Wi-Fi SSID network to use for the thermostat to connect the Cloud server. At Step 112, the application receives the identification of the Wi-Fi network to be used and the password for the Wi-Fi network is input into the display screen 515 of the mobile device 10 (FIG. 15). Once the application receives the password via input screen as shown in FIG. 15, the application will activate the communication to the thermostat. At Step 113 the mobile device connects to the thermostat SSID. There are no commands available on the display panel and no built in web server to synchronize the thermostat with a remote input device (RID) after the thermostat is placed in listen mode.

Figure 17:
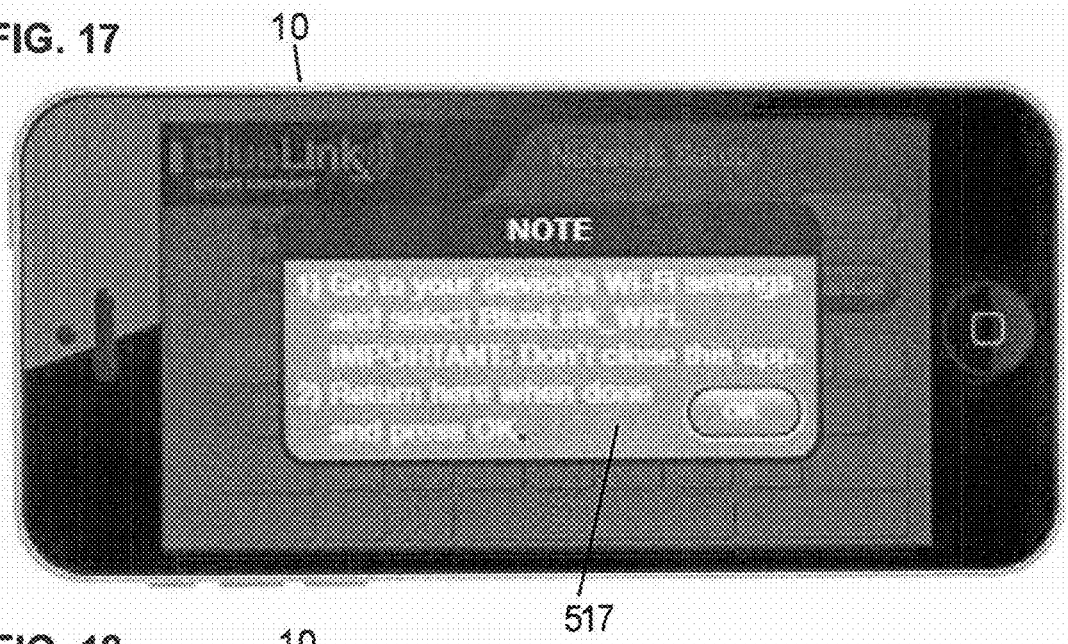
Figure 18:
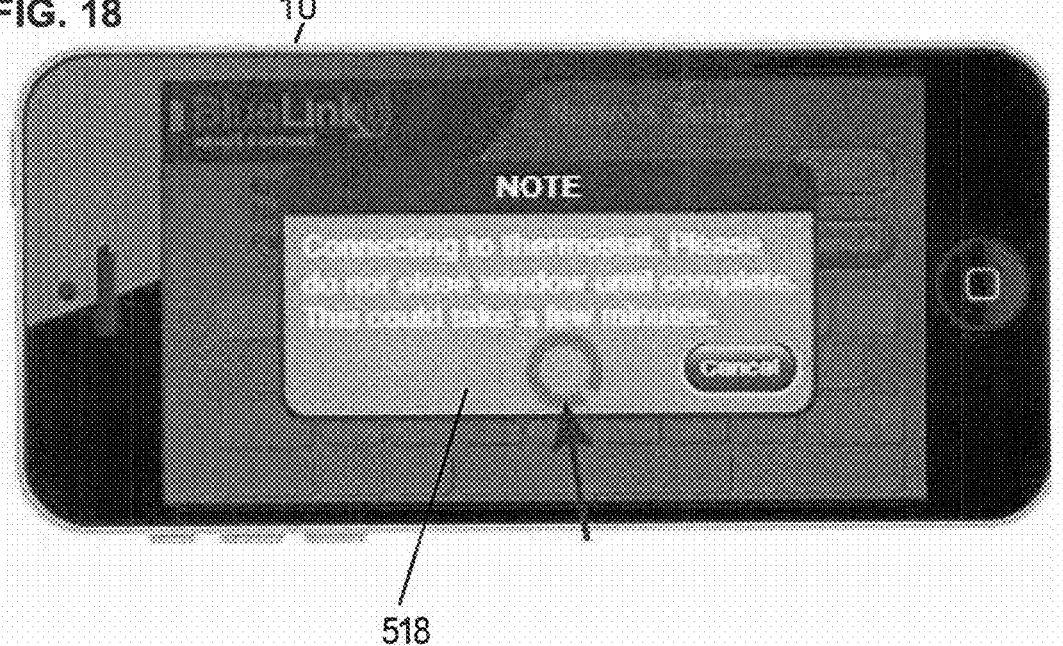

At Step 114, a display is provided by the mobile device that a P2P connection is being made to the thermostat device and indicated in the screen 518 in FIG. 18. In one implementation, to make the direct connection with the thermostat device, the mobile device prompts the user to configure the thermostat device such that it is put into a Wi-Fi connection mode, which is shown by the screen 516 in FIG. 16. In the Wi-Fi connection mode, the thermostat operates as an access point and is placed into a listening mode. As shown in FIG. 17 the mobile device 10 includes a pop-up window 517 that states, "1) Go to your device's Wi-Fi settings and select BlueLink_WiFi. Important: Don't close this app. 2) Return here when done and press OK." The screen 517 prompts the user to select a particular Wi-Fi network configuration. At Step 115, both the remote input device and the thermostat sets up the direct P2P connection between them. As shown in FIG. 18, a new pop-up window is displayed on the screen 518 that states, "Connecting to thermostat. Please do not close window until complete. This could take a few minutes." This screen may also display a timer or revolving circle to show that the connection process is occurring.

Figure 19:
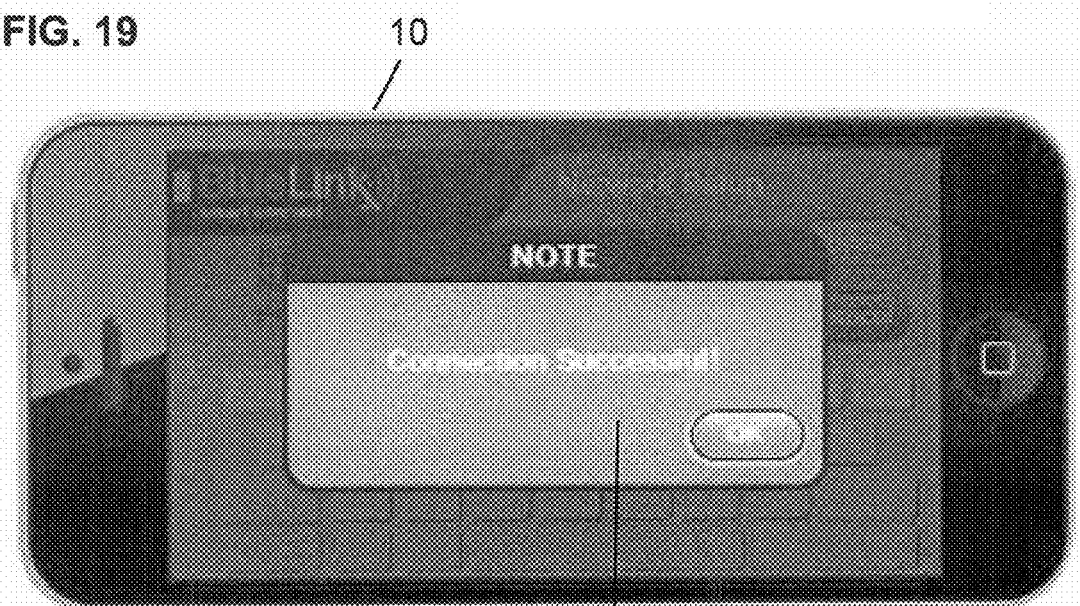

At Step 116, a display appears on the mobile device that the connection is successful as depicted in display screen 519 depicted in FIG. 19. At Step 117, the application will transfer, over the direct P2P connection between the thermostat and the mobile device, the Wi-Fi password to the thermostat and not the SSID of the selected Wi-Fi network. There are no commands available on the display panel or via physical buttons to configure or synchronize the thermostat via a remote wireless device after the thermostat has been placed in listen mode. At Step 118, the P2P connection between the thermostat and the mobile device is disconnected.

Figure 20:
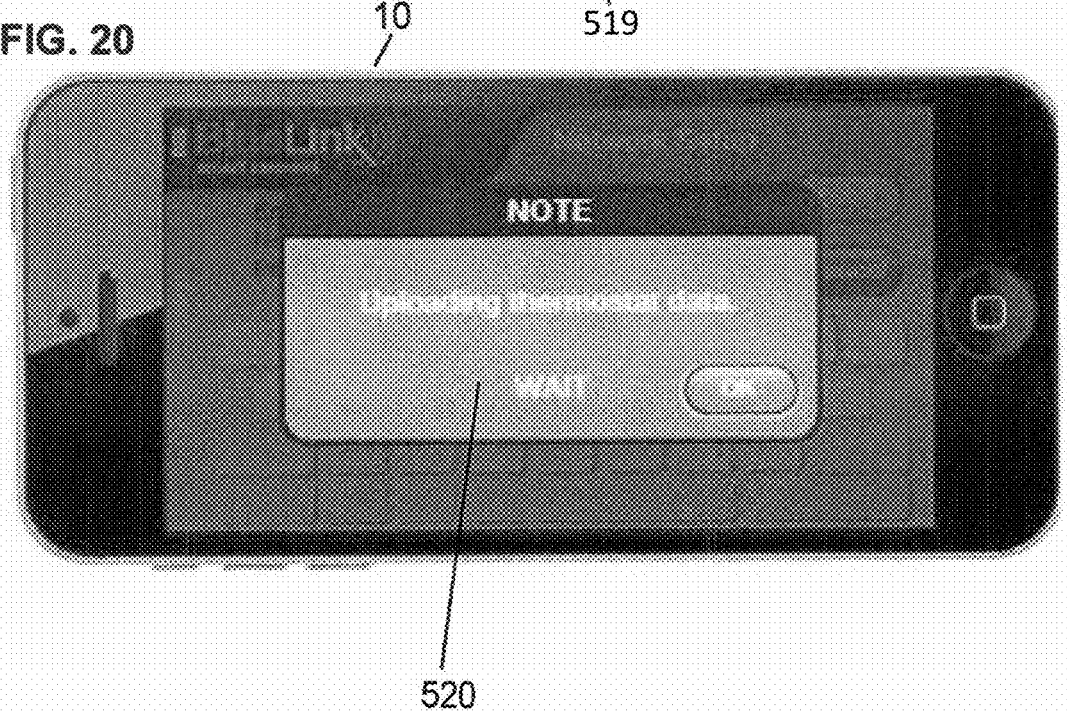

At Step 119, the thermostat device attempts to login to available network(s) with the received password. At 119, the thermostat device detects a list of available wireless networks, and tries to connect each one with the Wi-Fi access password received from the remote input device. When the thermostat device successfully connects to a Wi-Fi network using the password, at Step 120, the device transmits its device information to the cloud server. As shown in FIG. 20, the mobile device application uploads the thermostat's device data, such as the serial number entered via the screen 514. At Step 121, the Cloud server associates the user mobile device and the created user account via a unique thermostat serial number so that the mobile device 10 and the thermostat are synchronized. At Step 122, a display on the mobile device is displayed that the connection between the thermostat and the mobile device has been successful. At Step 123, the thermostat device is added to the app device list the mobile device 10. At Step 124, a display is made on the hand-held mobile device that the thermostat (as named previously in step 110) has been successfully added. Step 124 corresponds with FIG. 20 that depicts a pop-up window 520 that states, "Uploading thermostat data . . . WAIT." Upon completion of successfully adding the device the pop-up window in FIG. 20 will disappear.

At Step 125, the application on the mobile device is enabled. Enablement allows for control of the thermostat to begin via the mobile device 10. Step 125 is the final step that completes the code input and set-up between the mobile device and the thermostat. FIG. 21 depicts a screen shot of the standard control screen 521 following installation of the device. This screen allows a user to designate which locations in a building where a thermostat is located and has been linked for control by the mobile device. For example "Family Room" is highlighted in FIG. 21, so that the user may select an option with respect to the family room thermostat, such as "Update Thermostats." Step 126 is the end of the input and set-up process (FIG. 22).

It is noted that during the code input and set-up process, there is no requirement for the user to make any inputs to the thermostat itself or to interact with the display screen on the thermostat itself. The present invention allows for the set-up process solely via the user's hand-held mobile device 10. As can be understood, following the set-up, the user can anywhere in the world and control the thermostat via the mobile device with communications being sent through the standard communication networks to the Cloud, and the Cloud server which can interact with the Wi-Fi network at the user's residence or commercial facility. FIG. 23 depicts a diagram of the entire system in schematic form. The mobile device 10, having been set-up and synchronized as describe above communicates via cloud server 201 to a WiFi router 220 located in a home or business. The router 220 communicates with the thermostat 210 via transceiver 215 that includes communication protocol for wireless transmission and receiver functions, such IEEE 802.11. The transceiver communicates with the microprocessor 214 to control the systems connected to the thermostat, such HVAC system control relays 211 that control a furnace or boiler, etc. In an embodiment the microprocessor 214 may be programmed to include wireless mesh communication as disclosed in U.S. Pat. Nos. 8,410,931 and/or 8,233,471 assigned to SIPCO, the total disclosure of such publications are each incorporated by reference herein.

It is noted that the thermostat 210 may include a touch pad display screen 212, however the operation and set-up of the above invention does not require the user to input any commands or instructions via the touch pad display screen 212. All set-up steps and control can be accomplished via a mobile device 10 running the communication app and code input system that causes the microprocessor 214 to move to P2P when the set-up steps 100 to 126 are followed, as discussed herein.

FIG. 23 depicts a diagram of the entire system in schematic form. The mobile device 10, having been set-up and synchronized as describe above communicates via cloud server 201 to a WiFi router 220 located in a home or business. The router 220 communicates with the thermostat 210 via transceiver 215 that includes communication protocol for wireless transmission and receiver functions such IEEE 802.11. The transceiver communicates with the microprocessor 214 to control the systems connected to the thermostat, such HVAC system control relays 211 that control a furnace or boiler, etc. In an embodiment the microprocessor 214 may be programmed to include wireless mesh communication as disclosed in U.S. Pat. Nos. 8,410,931 and/or 8,233,471 assigned to SIPCO, the total disclosure of such publications are each incorporated by reference herein.

It is noted that the thermostat 210 as shown in FIG. 23 may include a touch pad display screen 212, however the operation and set-up of the above invention does not require the user to input any commands or instructions via the touch pad display screen 212. All set-up steps can be accomplished via a remote input device 10 running the communication app and code input system that causes the microprocessor 214 to move to a listen mode when the set-up steps 100 to 126 are followed, as discussed above. In an alternate embodiment, a remote computer (wired or wireless) may be used to set-up or control the thermostat 210 via the internet and a browser by similar set-up screens depicted in FIGS. 1-11 displayed on a web page according to well know TCP/IP systems.

The links outside of the thermostat 210 (FIG. 23). The thermostat links with local router and its Wi-Fi network that links to the internet or first network 201. External devices such as cloud server, personal computer of repairman or other service providers, external database, the external user's remote input device, such as a wireless tablet or phone and other wired users may communicate with the local router 220 (through firewall). The local router 220 can then communicate via Wi-Fi or other protocol such as Zigbee® on a second network with components including the thermostat 210 or other building environment control device that in turn can control HVAC equipment including a furnace heat pump (electric geothermal), electric heat, air conditioning unit, humidifier, dehumidifier, air exchanger, air cleaner or air damper. The thermostat 210 may receive input from wireless components 215, 220, that can provide temperature, humidity and other environmental factors either within the building or outside that may be used by the router 220 to automatically issue commands to the thermostat 210 based on the sensor input or building schedule information. The code input system of the present invention may also be operated via web-site on a computer or other means and each of the components of the system may have a unique identifier, such as an IP address. The router 220 may have a local cache to store the IP addresses when each device is joined to the network. The second network may require a service set identifier (SSID) as an access parameter or a passcode sent from transceiver 215 (FIG. 23).

Numerous variations and modifications will become apparent to those skilled in the art one the above disclosure is fully appreciated. It is intended that the claims be interpreted to embrace all such variations and modifications.

What is claimed is:

1. A method for configuring a thermostat to connect to a cloud server and a remote input device, the method performed by said thermostat and comprising:

placing said thermostat into a Wi-Fi network listening mode;

establishing a direct P2P connection with said remote input device;

receiving a Wi-Fi network password from said remote input device over said direct P2P connection wherein said thermostat does not receive a Wi-Fi network identifier from said remote input device;

terminating said direct P2P connection with said remote input device;

attempting to connect a Wi-Fi network router using said Wi-Fi network password; and where said thermostat successfully connects to said Wi-Fi network router, transmitting device data of said thermostat to a cloud server via said Wi-Fi network router.

2. The method of claim 1 further comprising receiving a user input to place said thermostat into said Wi-Fi network listening mode.

3. A method for configuring a comfort control device to connect to a cloud server and a remote input device, the method performed by said comfort control device and comprising:

placing said comfort control device into a wireless network listening mode;

establishing a direct wireless connection with a remote input device;

receiving a wireless network password from said remote input device over said direct wireless connection wherein said comfort control device does not receive a wireless network identifier from said remote input device;

terminating said direct wireless connection with said remote input device;

attempting to connect a wireless network router using said wireless network password; and where said comfort control device successfully connects to said wireless network router, transmitting device data of said comfort control device to a cloud server via said wireless network router.

4. The method of claim 3 wherein said comfort control device is a thermostat.

5. The method of claim 3 wherein said wireless network router is a Wi-Fi network router.

6. The method of claim 3 further comprising receiving a user input to place said comfort control device into said wireless network listening mode.

* * * * *